H. B. SAUERMAN.
SCRAPER APPARATUS.
APPLICATION FILED JAN. 15, 1913.
1,134,558.
Patented Apr. 6, 1915.
5 SHEETS—SHEET 3.
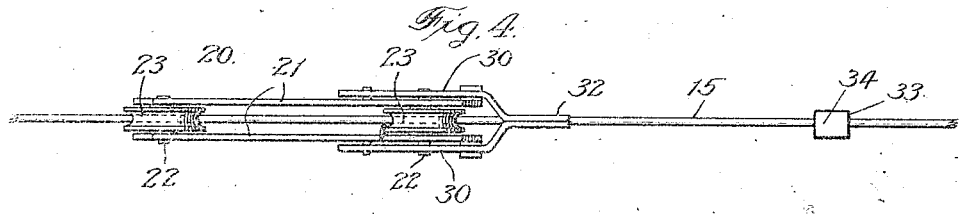
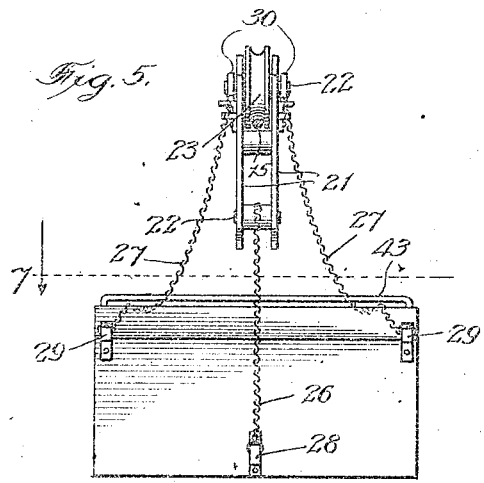
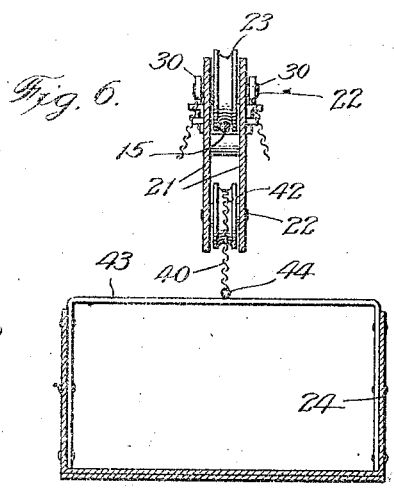
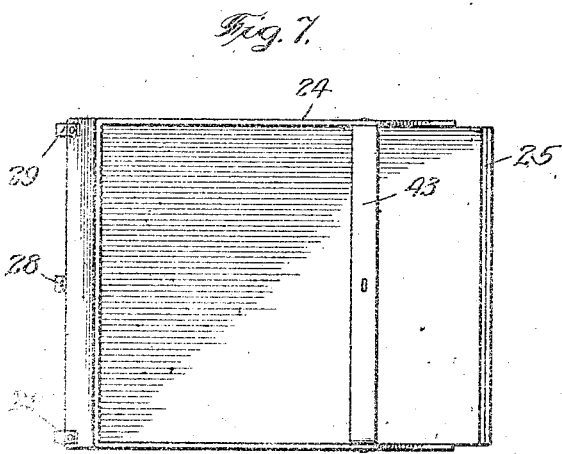
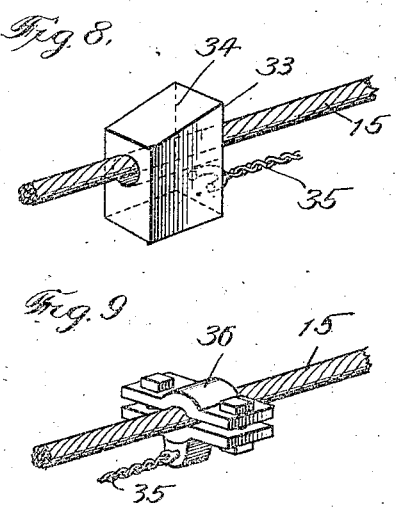
Inventor:
Henry B. Sauerman,
By Dyrenforth, Lee, Chritton and Wiles,
Att'ys.

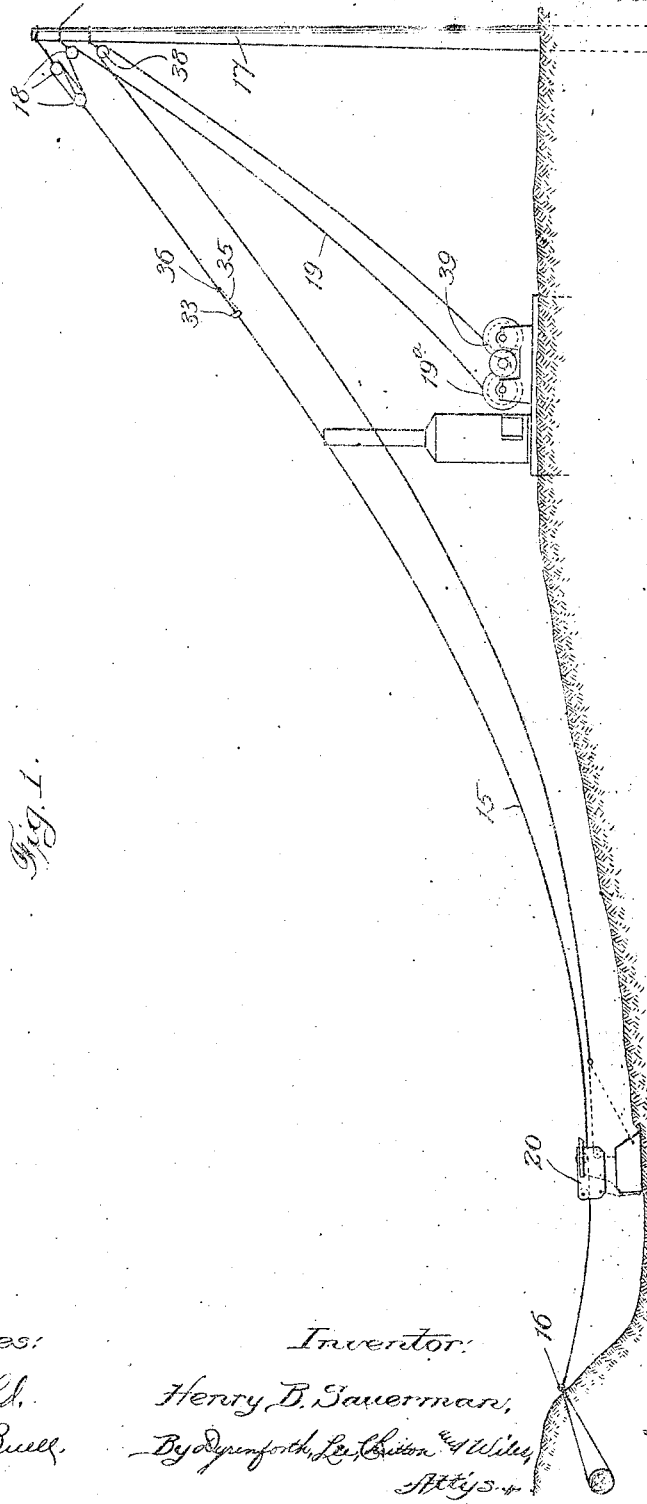

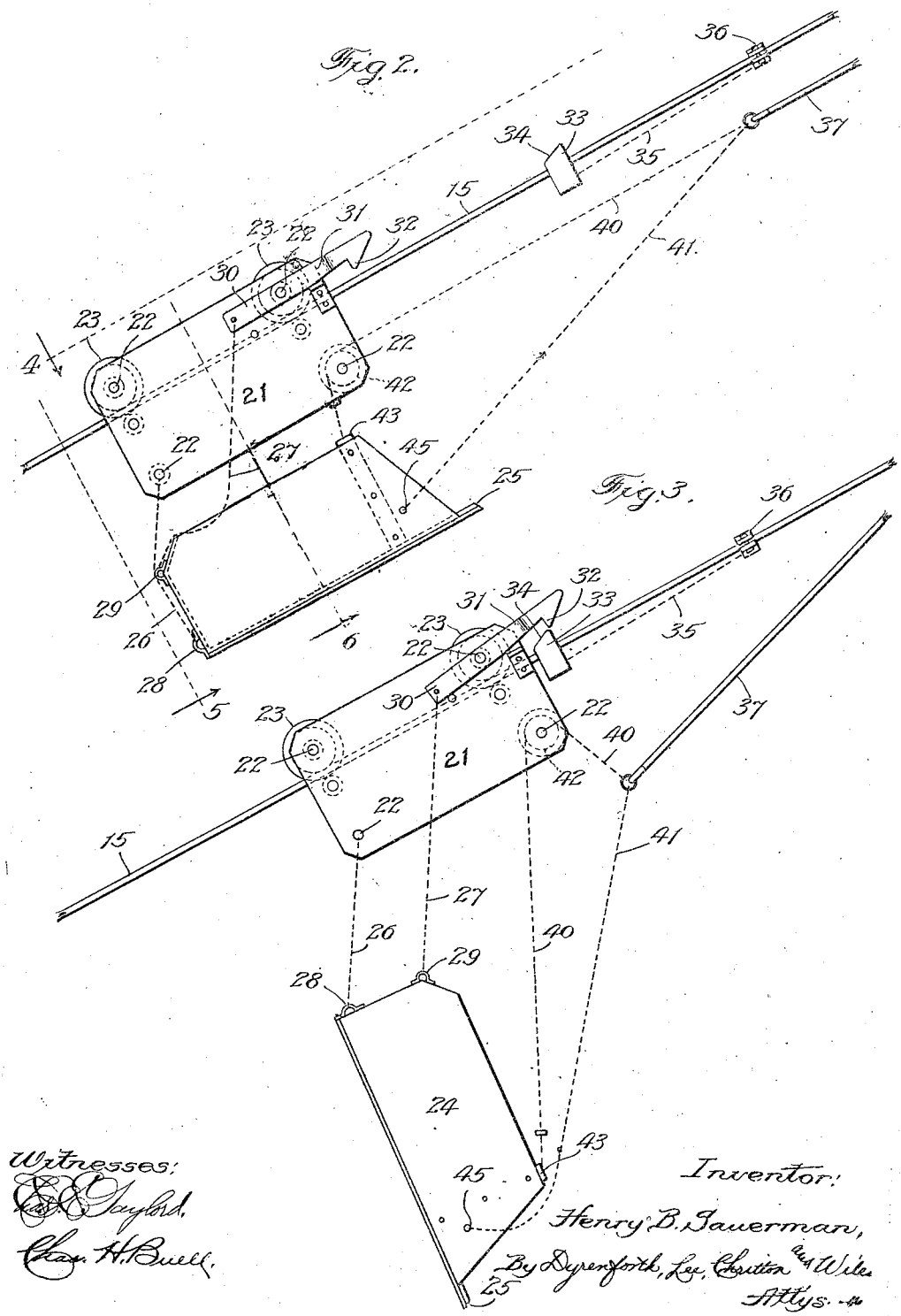

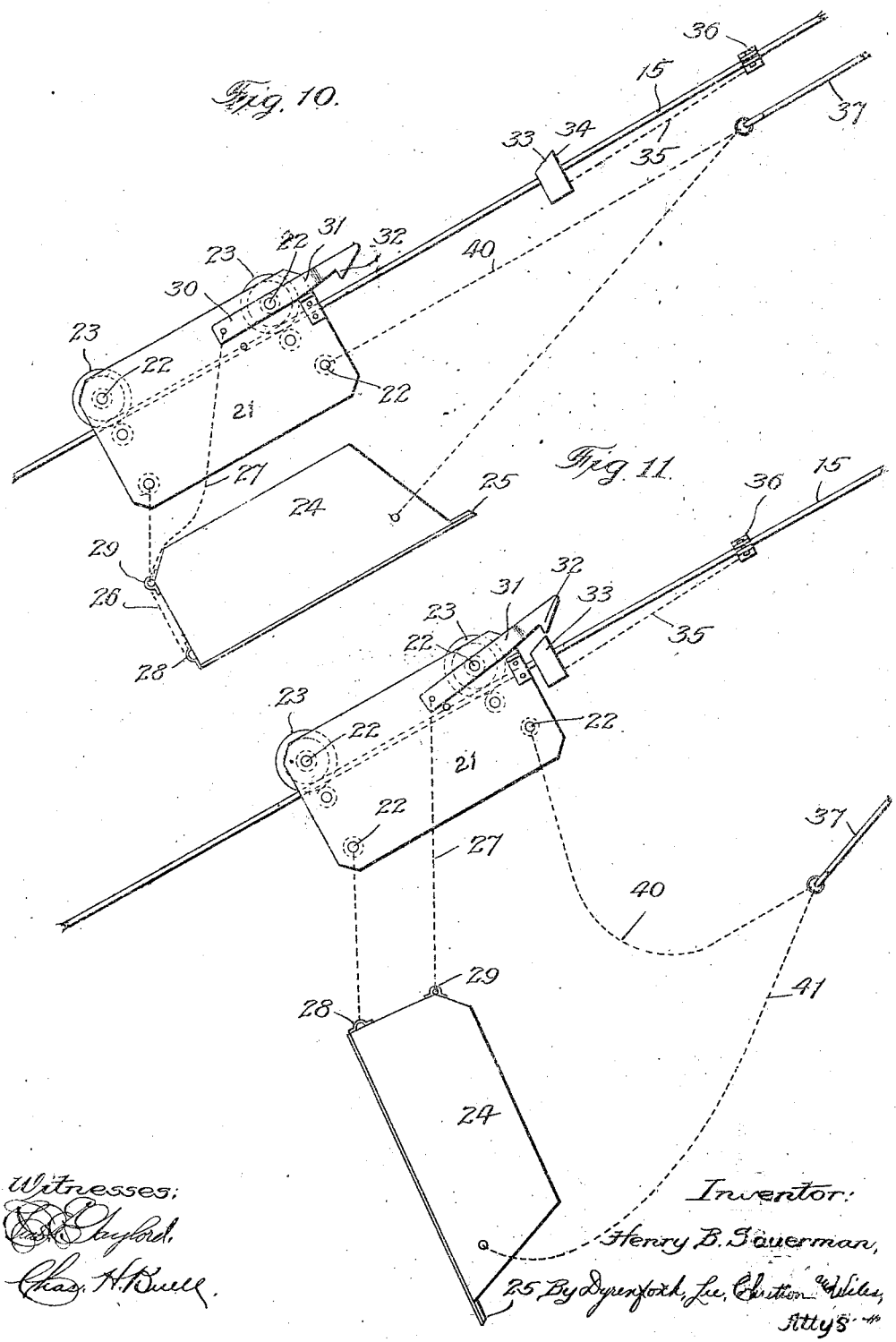

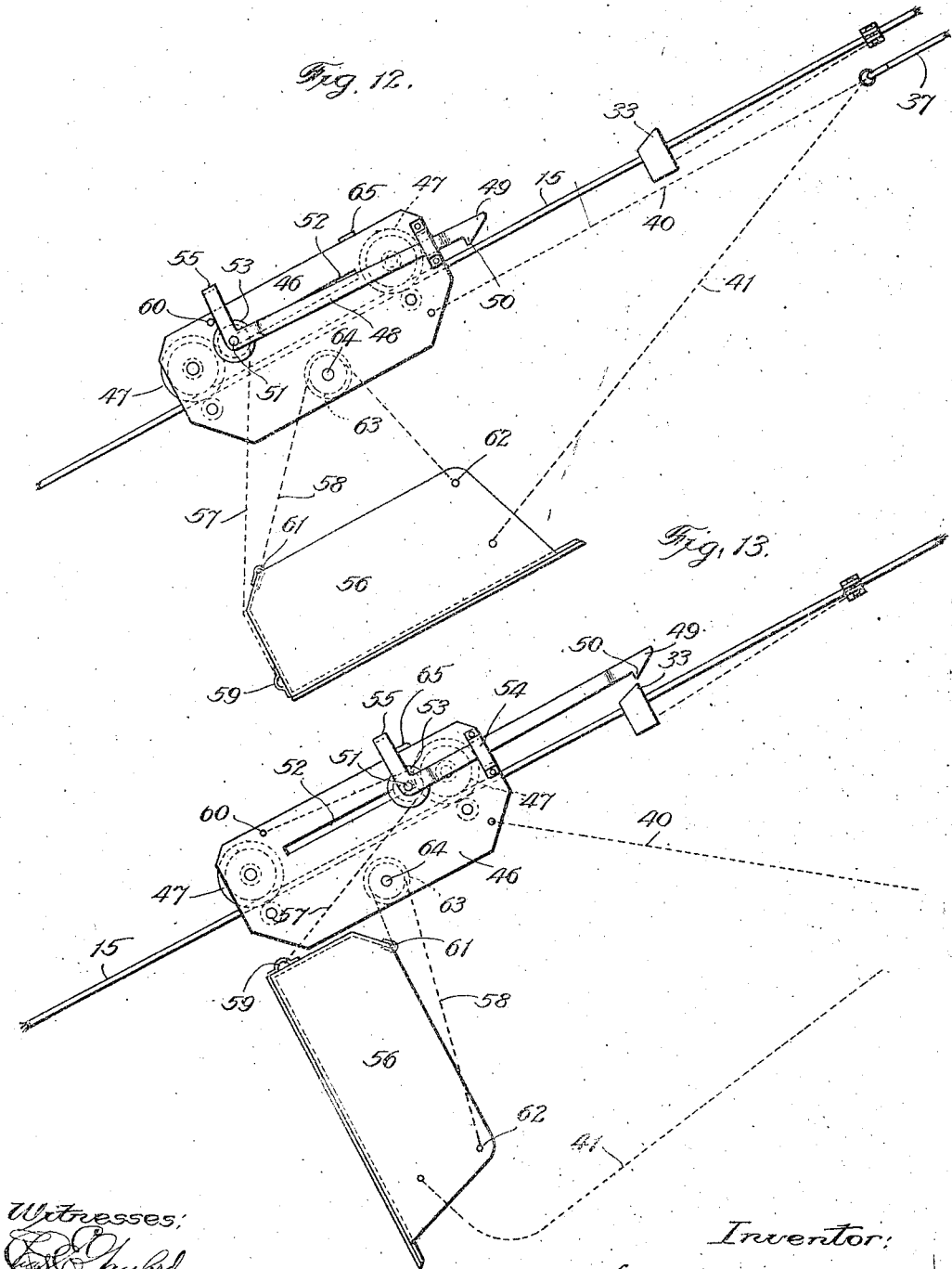

UNITED STATES PATENT OFFICE.

HENRY B. SAUERMAN, OF CHICAGO, ILLINOIS.

SCRAPER APPARATUS.

1,134,558. Specification of Letters Patent. Patented Apr. 6, 1915.

Application filed January 15, 1913. Serial No. 742,195.

*To all whom it may concern:*

Be it known that I, HENRY B. SAUERMAN, a citizen of the United States, residing at Chicago, in the county of Cook and State of Illinois, have invented new and useful Improvements in Scraper Apparatus, of which the following is a specification.

My invention relates to the type of scraper or dredge apparatus involving, generally stated, an inclined main cable, a carriage movably supported on said cable, a scraper-bucket supported from said carriage in a manner to permit it to be moved thereon from filling position to dumping position and vice versa, and means for hauling the carriage and bucket up said main cable to the dumping point.

My object is to provide for the automatic dumping of the bucket at a predetermined point, by means which shall be simple and economical of manufacture and which will not be liable to become impaired or deranged.

Referring to the accompanying drawings, Figure 1 is a view in elevation of an apparatus constructed in accordance with my invention, the apparatus being shown in the position is assumes when dredging, the construction shown constituting what I now regard as the preferred embodiment of my invention. Fig. 2 is a similar view of a part of the main and hauling cables and the carriage and bucket of Fig. 1, this view showing the main cable taut and the bucket in the position it assumes while being moved up on the main cable through the medium of the hauling cable, the carriage and bucket being shown in a position closely adjacent to the point of dumping. Fig. 3 is a view like Fig. 2 showing the bucket in the act of dumping. Fig. 4 is a plan view of the main cable and carriage thereon. Fig. 5 is a rear end view of the carriage and bucket carried thereby. Fig. 6 is an enlarged section taken at the line 6 on Fig. 2 and viewed in the direction of the arrow. Fig. 7 is a plan view of the bucket, this view being taken at the line 7 on Fig. 5 and viewed in the direction of the arrow. Fig. 8 is a perspective view of a part of the main cable and a sliding block thereon forming one of the members of the means for releasably locking the carriage in a predetermined position during the dumping of the bucket. Fig. 9 is a similar view of the means on the main cable for limiting the movement of the block shown in Fig. 8. Fig. 10 is a view like Fig. 2 of another form in which my invention may be embodied. Fig. 11 is a view like Fig. 3 of the construction illustrated in Fig. 10; and Figs. 12 and 13, views like Figs. 2 and 3, respectively, of still another embodiment of my invention.

The inclined main cable which would be supported to extend across the ground to be excavated or dredged, is represented at 15 and is anchored at its lower end, as indicated at 16, and at its opposite upper end connects with a tauting mechanism of any suitable and well-known construction secured to the upper end of a mast 17, and as shown, formed of a system of pulleys 18 connected with a cable 19 which passes over a suitably operated drum $19^a$, whereby the cable 15 may be slackened or made taut at will.

Mounted on the cable 15 to travel thereon is a carriage which, in the construction illustrated in Figs. 1 to 9 inclusive, is represented at 20. The carriage 20 is formed of two plates 21 spaced apart and connected together by cross-rods 22, the upper ones of which form journals for grooved wheels 23 located between these plates, and at which the carriage is supported on the cable 15 to permit it to travel thereon.

The scraper bucket which is represented at 24 is provided with an open end equipped with a cutting edge 25 extending in advance thereof as is common in constructions of buckets of this type. The bucket 24 is supported from the carriage 20 through the medium of flexible connections 26 and 27. These connections may be of any suitable construction, but they are preferably provided in the form of chains, the chain 26 being connected at one end with the lower rear one of the rods 22 and between the plates 21, and at its opposite end with the lower rear end of the bucket 24 as represented at 28; and the chains 27 being connected with the upper rear end of the bucket as represented at 29. The chain 27 is formed of two sections, as shown in Fig. 5, the upper ends of these chain sections being connected beyond the plates 21 with the rear bifurcated end 30 of a latch-device 31 pivoted on the upper forward one of the rods 22 and extending at its shouldered section 32 medially of and in advance of the front end of the carriage 20, the latch 31 being provided for coöperation with a block 33 having a cam surface 34 and slidably mounted on the main cable 15 and connected by means of a chain 35 with a clamp 36 adjustably secured to the cable 15 for a purpose hereinafter explained.

The carriage and bucket are adapted to be operated through the medium of a hauling cable 37 passing over a pulley 38 on the mast 17 and connected with a drum 39 operated in any suitable and well-known manner, and at its opposite end connected with the forward ends of two chains 40 and 41, the chain 40 passing over a pulley 42 rotatably mounted on the lower forward one of the rods 22 on the carriage and connected with a cross-bar 43 at the upper front end of the bucket, as represented at 44; and the chain 41 connected with the sides of the bucket, as represented at 45.

In the operation of the apparatus, assuming it to be in scraping position, Fig. 1, wherein the cable 15 is slack and the bucket 25 lies on the material to be operated on, the bucket is dragged along the material by pulling on the hauling cable 37 which causes the bucket to fill. As soon as the bucket has filled, the operator, by operating the drum 20 draws the cable 15 taut, and by continuing to pull on the hauling line 37 drags the bucket 24 and carriage 20 up the cable 15 as represented in Fig. 2, the bucket 24 during this operation being held in position for retaining its load by reason of its connections with the carriage and with the hauling cable 37, as described. The operator continues to pull on the cable 37 until the shouldered portion 32 of the latch 31 passes over the block 33, which permits the latch to interlock with said block, thus preventing the carriage from running down on the cable 15, and permitting the bucket 24 to swing downwardly at its flexible connection 26 with the carriage, to dumping position. The chains 26 and 27 are of such lengths that the chain 27 is pulled taut when the bucket swings to discharge position and thus actuates the latch-device 31 in a direction to raise its shouldered portion 32 out of engagement with the block 33, whereupon the carriage and bucket, upon paying out the cable 37 run down the cable 15 to reposition the bucket for filling.

The construction illustrated in Figs. 10 and 11 is the same as that just described, excepting that instead of running the chain 40 over a pulley on the carriage 20, it is connected directly with the lower forward one of the rods 22 of the carriage, as represented, this rod in the present case having no pulley.

In the construction illustrated in Figs. 12 and 13 the carriage, which is of the same general construction as the carriage 20, is represented at 46, this carriage being mounted at wheels 47 on the cable 15. The latch-device in this construction for releasably holding the carriage 46 in position while the bucket is being dumped, is formed of a pair of bars 48 arranged at opposite sides of the carriage and terminating at their forward ends in a single latch 49 having a shouldered portion 50 and arranged to coöperate with the block 33. The rear ends of the bars 48 are connected together by a cross-rod 51 which extends through opposed slots 52 in the side plates of the carriage, and on which rod pulleys 53 are journaled, one at each side of and beyond the side plates of the carriage, the bars 48 extending at their forward ends in guides 54 at opposite sides of the carriage and connected together at their rear ends by a yoke 55.

The bucket, which is the same as the bucket 24, is represented at 56 and is supported from the carriage 46 by flexible connections 57 and 58, these connections preferably being chains. The connection 57 is preferably formed of two chains connected at their lower ends to the rear lower end of the bucket 56 toward opposite sides thereof, as represented of one of the chains at 59, and at their upper ends extend over the pulleys 53 and connect with the carriage at opposite sides thereof, as represented of one of the chains at 60. The other connection 58 is preferably a single length of chain which is connected at its opposite ends to the rear upper end of the bucket and the front upper end thereof, as represented at 61 and 62, respectively, and extending intermediate its ends over a pulley 63 located between the side plates of the carriage and journaled on a cross-rod 64 thereon. The hauling means are the same as those described of the construction illustrated in Figs. 10 and 11.

The positions occupied by the parts of the apparatus just described, during the hauling of the carriage and the filled bucket up the cable 15 are as represented in Fig. 12. As soon as the carriage has been pulled up the cable far enough to cause its latch to interlock with the block 33, the operator slackens the cable 37 with the result of permitting the carriage 46 and bucket 56 to run for a slight distance down the cable 15, but as the latch 50 is in engagement with the block 33, said latch and the pulleys 53 connected therewith are held stationary relative to the movement of the carriage 46 in running down the cable, and as the upper and lower ends of the chains 57 are connected with the carriage and bucket, respectively, and extend at their intermediate portions over the pulleys 53, the movement of the carriage 46, as described, will, by pulling on the chains 57 swing the bucket 56 to the dumping position illustrated in Fig. 13. The carriage 46 is provided across its top with a bar 65 projecting beyond the carriage at opposite sides thereof and into the path of movement of which, as the carriage 46 runs down the cable 15 while the latch is in engagement with the block 33, the depending arms of the yoke 55 extend, with the result of causing the shouldered portion 50 of the latch to be lifted out of engagement with the block 33 when the bucket 56 assumes the dumping position, all as represented in Fig. 13. The latch 49 having thus been disengaged from the block 33, the carriage 46 and bucket 56 are free to run down the cable 15 under the control of the operator through the medium of the hauling cable 37.

It will be understood from the foregoing that in all of the constructions illustrated the hauling of the carriage and bucket up the cable, the dumping thereof and the return of the carriage and bucket to a position for re-filling, is controlled through the medium of the hauling cable 37, and that in each instance the dumping of the bucket 56 is accomplished by slackening the cable 37.

The point at which the bucket is dumped is controlled by the position of the block 33 which may be varied, as described, by shifting the position of the clamp 36 on the cable 15. The block 33 may, if desired, be rigid on the cable 15, but it is preferred that it be supported thereon in a manner to permit it to yield upwardly on the cable 15 when struck by the latch of the carriage-locking mechanism, as the mechanism is thus caused to operate more smoothly, with less jar and with less liability of becoming impaired than if the block 33 were rigid on the cable.

While I have illustrated certain embodiments of my invention, I do not wish to be understood as intending to limit it to the particular constructions illustrated, as the same may be variously modified and altered without departing from the spirit of my invention. Neither do I wish to be understood as intending to limit my invention to the three embodiments illustrated, and variations or modifications therein, as the same may be embodied in various other constructions, it being my intention to claim everything to which I am entitled in view of the prior state of the art.

What I claim as new and desire to secure by Letters Patent is:

1. In a scraper apparatus having an inclined cable, a carriage movable thereon, and a dumping scraper on the carriage with a draft-cable connected with the dumping scraper, locking means in advance of the limit of travel of the carriage and automatically engageable by said carriage, and means operating automatically to disengage said carriage from said locking means upon slackening said draft-cable.

2. In a scraper apparatus having an inclined cable, a carriage movable thereon, and a dumping scraper on the carriage with a draft-cable connected with the dumping scraper, locking means on said inclined cable extending above the point of support of the carriage on said cable and automatically engageable by said carriage, and means operating automatically to disengage said carriage from said locking means upon slackening said draft-cable.

3. In a scraper apparatus, the combination of a main inclined cable, a carriage movable thereon, a scraper bucket supported from and movable on said carriage to dumping and filling positions, a draft-cable connected with the scraper bucket, said bucket being movable to dumping position when said draft-cable is slackened, locking means extending above the point of support of the carriage on said cable and on said main cable automatically engageable by said carriage, and means operating automatically to disengage said carriage from said locking means upon slackening said draft-cable.

4. In a scraper apparatus, the combination of a main inclined cable, a carriage movable thereon, a scraper bucket supported from and movable on said carriage to dumping and filling positions, a draft-cable connected with the scraper bucket, said bucket being movable to dumping position when said draft-cable is slackened, locking means in advance of the limit of travel of said carriage automatically engageable by said carriage, and means operating by the movement of the scraper-bucket in dumping for automatically disengaging said carriage from said locking means.

5. In a scraper apparatus having a main cable, a carriage movable thereon, and a dumping scraper on the carriage with a draft-cable connected with the scraper, means extending in advance of the limit of travel of said carriage and into the path of and engageable by said movable carriage for determining the point of dumping and from which the carriage is automatically released to permit its return to scraping position by the movement of the scraper in dumping.

6. The combination of a main inclined cable, a carriage movable thereon, a scraper-bucket supported from said carriage and movable thereon to dumping and filling positions, a cable for hauling the bucket and carriage along said main cable, and by means of which the bucket is held in load-carrying position, locking means on said main cable extending above the point of support of the carriage on said cable and automatically engageable by said carriage, and means operating automatically upon the movement of said bucket to dumping position to disengage said carriage from said locking means.

7. In a scraper apparatus, the combination of a main inclined cable, a carriage movable thereon, a scraper bucket supported from and movable on said carriage to dumping and filling positions, a draft-cable connected with the scraper bucket and by which when pulled taut, the latter is held in load-carrying position, locking means in advance of the limit of travel of said carriage and automatically engageable by said carriage, and means operating automatically upon slackening said draft-cable to release said carriage from said locking means.

8. In a scraper apparatus, the combination of a main inclined cable, a carriage movable thereon, a scraper bucket supported from and movable on said carriage to dumping and filling positions, a draft-cable connected with the scraper bucket and by which the scraper bucket is held in load-carrying position, a latch pivoted on said carriage, a block engageable by said latch, said latch and block extending in advance of the limit of travel of said carriage, and means operating automatically to disengage said latch from said block upon slackening said draft-cable.

9. In a scraper apparatus, the combination of a main inclined cable, a carriage movable thereon, a scraper bucket supported from and movable on said carriage to dumping and filling positions, a draft-cable connected with the scraper bucket, and by which the scraper bucket is held in load-carrying position, a latch pivoted on said carriage, a block engageable by said latch, said latch and block extending in advance of the limit of travel of said carriage, and means operating automatically to disengage said latch from said block by the movement of the bucket to dumping position upon slackening said draft-cable.

10. In a scraper apparatus, the combination of a main inclined cable, a carriage movable thereon, a scraper-bucket supported from and movable on said carriage to dumping and filling positions, a draft-cable connected with the scraper-bucket, and by which the bucket is held in load-carrying position, a latch pivoted on said carriage, a block engageable by said latch, and flexible means connected with said bucket and with said latch and operating, when said bucket moves to dumping position, upon slackening said draft-cable, to disengage said latch from said block.

11. In a scraper apparatus, the combination of a main inclined cable, a carriage movable thereon, a scraper bucket supported from and movable on said carriage to dumping and filling positions, a draft-cable connected with the scraper bucket, locking means extending in advance of the limit of travel of said carriage and automatically engageable by said carriage, and means operating automatically by the movement of the scraper in dumping to disengage said carriage from said locking means.

12. In a scraper apparatus, the combination with a main cable, a carriage movable thereon, and a dumping scraper on the carriage with a draft cable connected with the dumping scraper, locking means on said main cable extending above the point of support of the carriage on said cable and automatically engageable by said carriage and yieldable in the direction of movement of said carriage, and means operating automatically to disengage said carriage from said locking means upon slackening said draft-cable.

13. In a scraper apparatus, the combination with a main inclined cable, a carriage movable thereon, and a dumping scraper on the carriage with a draft-cable connected with the dumping scraper, of a block slidable on said main cable, means for limiting the movement of said block, a latch-device on said carriage adapted to automatically engage said block, said block and latch extending above the point of support of the carriage on said cable and means operating automatically to disengage said latch from said block upon slackening said draft-cable.

14. In a scraper apparatus, the combination of a main inclined cable, a carriage movable thereon and including a latch device, a dumping scraper on said carriage with a draft-cable connected with the dumping scraper, a stop with which said latch automatically engages, said stop and latch extending in advance of the limit of travel of said carriage, and means operating automatically to disengage said latch from said stop upon slackening said draft-cable.

15. In a scraper apparatus, the combination of a main inclined cable, a carriage movable thereon and including a latch device, a dumping scraper on said carriage with a draft-cable connected with the dumping scraper, a stop on said main cable with which said latch automatically engages, said latch and stop extending above the point of support of the carriage on said cable and means operating automatically to disengage said latch from said stop upon slackening said draft-cable.

16. An excavating apparatus comprising a track, a carriage mounted on said track, an excavator bucket hinged to said carriage, means for supporting said bucket in a horizontal position, means for dumping said bucket at a predetermined point, a latch pivoted to the carriage and adapted to engage with a catch positioned to hold said carriage during the operation of dumping, and a flexible connection between said latch and said bucket so positioned in relation to the pivot that when the bucket stands in dumped position, said connection will release said latch, substantially as set forth.

17. In an excavating apparatus, the combination of a track, a carriage mounted on said track, an excavator bucket pivoted to said carriage, means for supporting said bucket in horizontal position, means for dumping said bucket at a predetermined point, a catch located adjacent to said point, a latch pivoted on said carriage and adapted to engage said catch, and a normally slack flexible connection running from said latch on one side of its pivot to said bucket at a point on that side of its pivot which will take up said slack and release said latch when the bucket is dumped, substantially as set forth.

HENRY B. SAUERMAN.

Witnesses:
NELLIE B. DEARBORN,
JULIUS LAUDERMAN.